(12) United States Patent
Mihara et al.

(10) Patent No.: US 7,154,589 B2
(45) Date of Patent: Dec. 26, 2006

(54) RANGEFINDER APPARATUS

(75) Inventors: Yoshikazu Mihara, Saitama (JP); Hideo Yoshida, Saitama (JP)

(73) Assignee: Fujinon Corporation, Saitama (JP)

( * ) Notice: Subject to any disclaimer, the term of this patent is extended or adjusted under 35 U.S.C. 154(b) by 220 days.

(21) Appl. No.: 10/911,711

(22) Filed: Aug. 5, 2004

(65) Prior Publication Data
US 2005/0036128 A1    Feb. 17, 2005

(30) Foreign Application Priority Data
Aug. 15, 2003    (JP)    ............... 2003-293852

(51) Int. Cl.
*G01C 3/00*    (2006.01)
(52) U.S. Cl. ............... 356/3.13; 356/3.1; 356/3.14; 356/3.15
(58) Field of Classification Search ............... 356/3.13
See application file for complete search history.

(56) References Cited

U.S. PATENT DOCUMENTS 4,760,419 A * 7/1988 Fujiwara et al. ............... 396/99
5,754,281 A * 5/1998 Maeda ............... 356/3.08
6,313,464 B1 * 11/2001 Schrader ............... 250/349
6,433,859 B1    8/2002 Nakata

* cited by examiner

*Primary Examiner*—Thomas H. Tarcza
*Assistant Examiner*—Luke D. Ratcliffe
(74) *Attorney, Agent, or Firm*—Leydig, Voit & Mayer, Ltd.

(57) ABSTRACT

In a rangefinder, if sensor data initially received by a sensor data storage part from an A/D converter includes data with low contrast, the sensor data storage part receives the sensor data at least one additional time, adds additionally received sensor data to the initially received sensor data, and stores their sum. In accordance with the sum of sensor data stored in the sensor data storage part, a correlation calculation and a rangefinding calculation are carried out, which enables rangefinding with respect to an object having low contrast; Also, the time required for A/D-converting the sensor data again and adding the resulting data to those initially obtained is much shorter than the integration time required for integrating output signals of a pair of line sensors a second time for a region with low luminance and low contrast.

1 Claim, 10 Drawing Sheets

RANGEFINDER APPARATUS

BACKGROUND OF THE INVENTION

1. Field of the Invention

The present invention relates to a rangefinder apparatus for use in AF (Auto Focus) cameras and video cameras, etc.

2. Related Background Art

As a rangefinding system for rangefinder apparatus used in AF (Auto Focus) cameras and video cameras, a so-called passive rangefinding scheme which makes it possible to measure distances ranging from a short distance to a long distance if an object image has a certain degree of brightness and contrast has conventionally been known in general.

In the passive rangefinding scheme, correlation is calculated according to output signals of a pair of light-receiving sensors on which a pair of object images are respectively formed by external light from an object, and the distance to the object is calculated according to the smallest minimal value (peak value) exhibiting the highest degree of correlation in the correlation values obtained by the correlation calculation. For accurately calculating the distance to the object, the correlation calculation is usually carried out for each of a plurality of rangefinding areas into which the field of view of a camera is divided.

In general, in the passive rangefinding scheme, output signals from a pair of light-receiving sensors (line sensors) are accumulated (integrated), so as to generate a pair of sensor data, which are then A/D-converted and stored for the correlation calculation. Then, while a pair of windows as areas for reading out a pair of data used for the correlation calculation from the stored pair of sensor data are relatively shifted in succession, a pair of data are sequentially read out, and the correlation calculation is carried out. According to the amount of shift of windows corresponding to the smallest minimal value (local minimum value) (peak value) exhibiting the highest degree of correlation in the correlation values obtained by the correlation calculation, the distance to the object is calculated.

Known as a rangefinder apparatus of this kind of passive rangefinding scheme is one which, if the sensor data integrating the line sensor output signals include a region with a low luminance and low contrast luminance distribution when taking a picture against light or the background of a night scene, the output signals of line sensors are integrated again for the region with the low luminance and low contrast in order to enable the rangefinding for an object in this region (see, for example, Patent Document 1).

[Patent Document 1] Japanese Patent Application Laid-Open (Tokukai) No. 2001-141987

SUMMARY OF THE INVENTION

In the rangefinder apparatus disclosed in Patent Document 1, the rangefinding for an object is possible when taking a picture against light or the background of a night scene as well, so that the rangefinding accuracy improves. However, since output signals from a pair of line sensors are integrated again, a long integration time is additionally required, which greatly increases the rangefinding time.

It is therefore an object of the present invention to provide a rangefinder apparatus which can improve the rangefinding accuracy for an object having a low contrast and can shorten the rangefinding time therefor.

The present invention provides a rangefinder apparatus of a passive rangefinding type for successively carrying out a correlation calculation for each rangefinding area according to respective output signals of a pair of light-receiving sensors on which a pair of images are formed by external light from an object to be subjected to rangefinding, and calculating a distance to the object according to a minimal value exhibiting the highest degree of correlation in correlation values obtained by correlation calculations of individual rangefinding areas; the rangefinder apparatus comprising sensor data storage means for inputting a pair of A/D-converted sensor data generated according to the output signals of the pair of light-receiving sensors and storing thus inputted sensor data as sensor data for the correlation calculation; wherein the sensor data storage means is configured such as to input sensor data at least once more for a rangefinding area whose sensor data inputted for the first time includes data with a low contrast, adds thus inputted sensor data to the sensor data inputted for the first time, and stores thus obtained sum of sensor data.

In the rangefinder apparatus in accordance with the present invention, for a rangefinding area whose sensor data inputted for the first time includes data with a low contrast, the sensor data storage means stores sensor data at least once more, adds thus inputted sensor data to the sensor data inputted for the first time, and stores thus obtained sum of sensor data. Correlation and rangefinding calculations are carried out according to the sum of sensor data stored in the sensor data storage means, which enables rangefinding for an object having a low contrast to be subjected to rangefinding.

The time required for A/D-converting the sensor data again and adding thus obtained digital data to those obtained earlier for the rangefinding area including low contrast sensor data is much shorter than the integration time required for integrating output signals of a pair of line sensors again for a region with a low luminance and a low contrast as in the conventional example, whereby the rangefinding time is greatly shortened.

DESCRIPTION OF THE PREFERRED EMBODIMENTS

Figure 1:
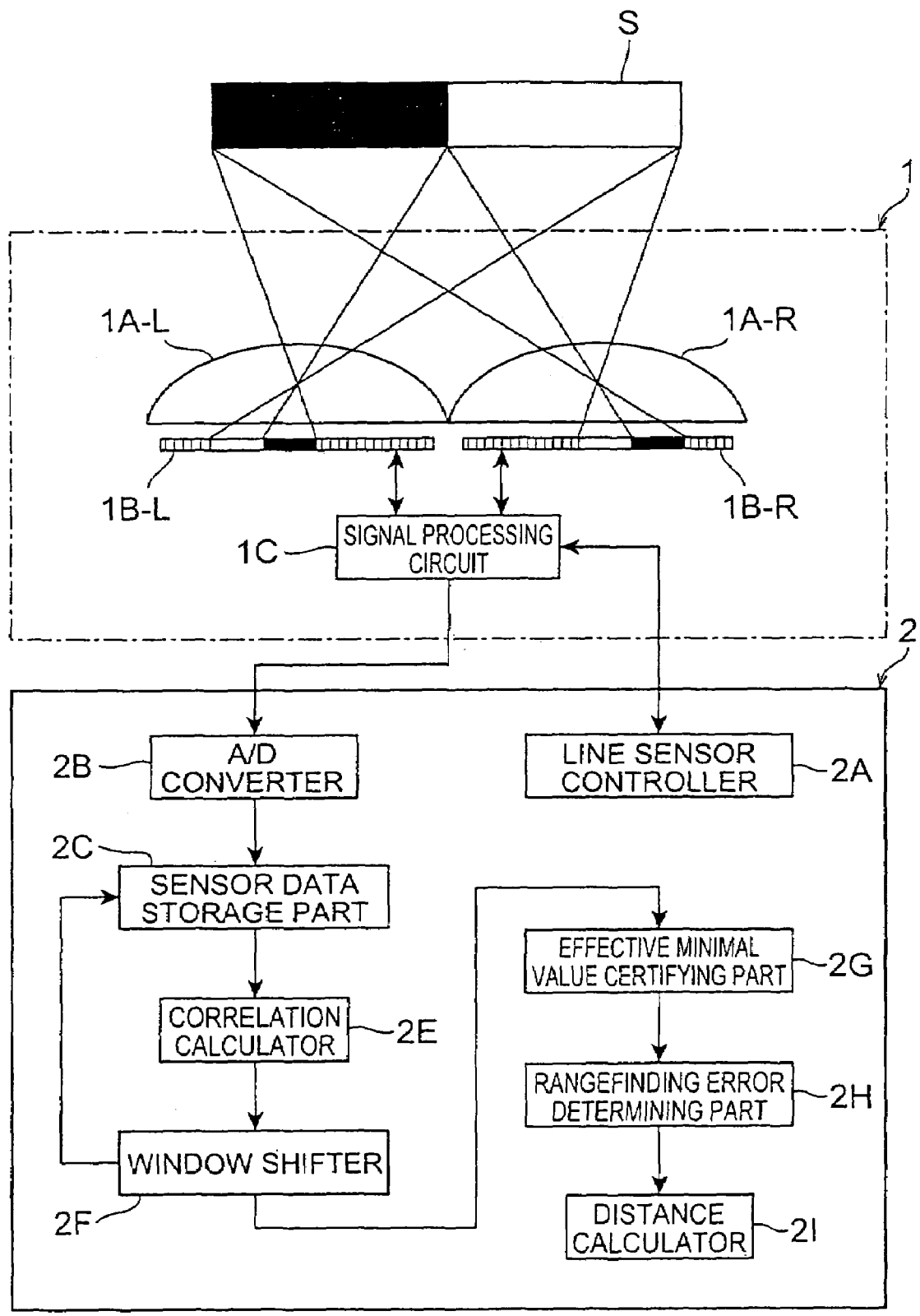
FIG. 1 A schematic view showing the configuration of the rangefinder apparatus in accordance with an embodiment of the present invention.
Figure 2:
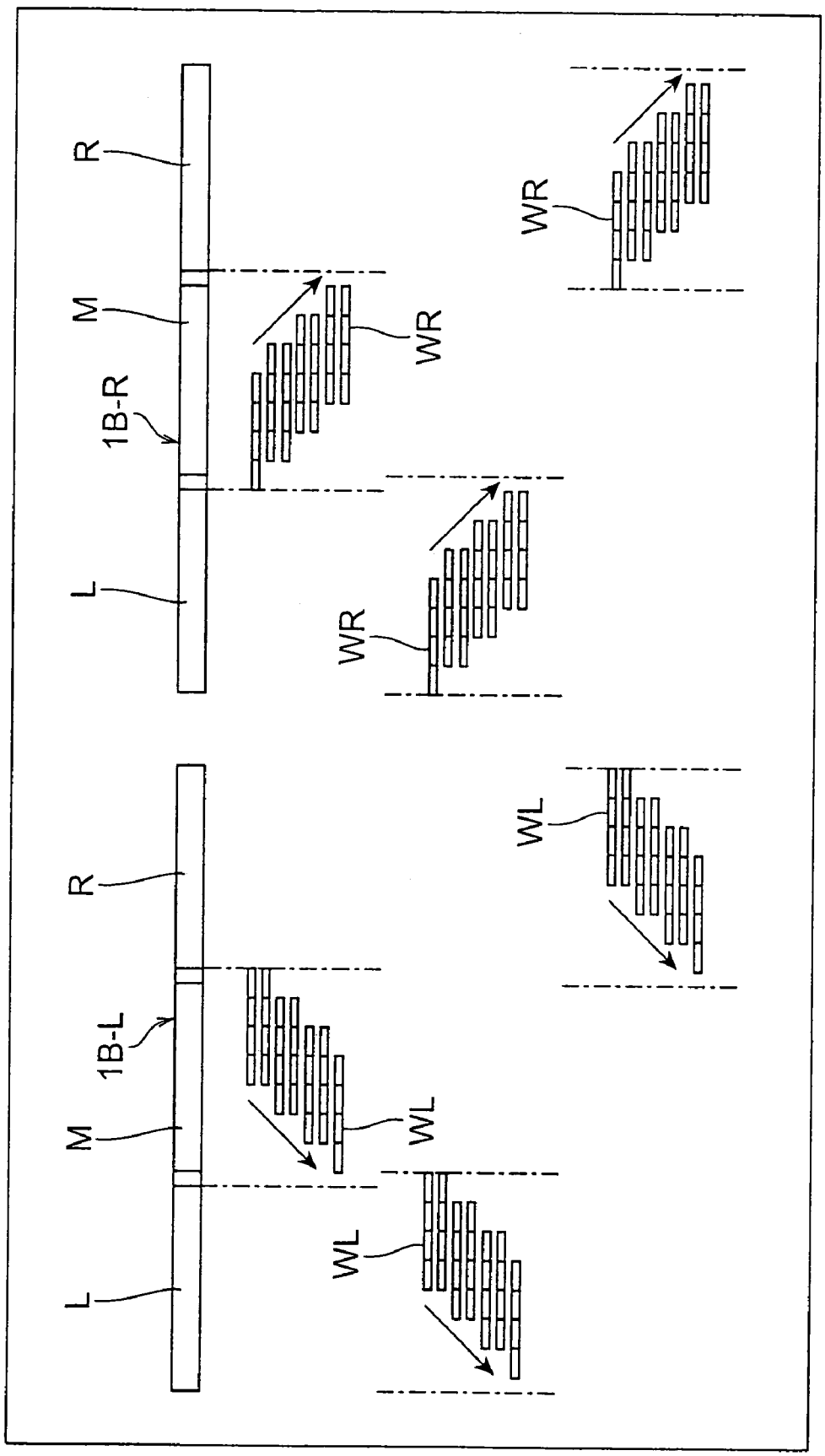
FIG. 2 A diagram showing the relationship between the line sensors shown in FIG. 1 and window shifting operations.

In the following, embodiments of the rangefinding apparatus in accordance with the present invention will be explained with reference to the drawings. In the drawings for reference, FIG. 1 is a schematic view showing the configuration of the rangefinder apparatus in accordance with an embodiment. FIG. 2 is a diagram showing the relationship between the line sensors shown in FIG. 1 and window shifting operations.

The rangefinder apparatus in accordance with this embodiment is one used for calculating the distance from a taking lens to an object to be subjected to rangefinding in an AF (Auto Focus) camera or video camera, for example. As shown in FIG. 1, this rangefinder apparatus comprises a line sensor unit 1 including a pair of left and right rangefinding lenses 1A-L and 1A-R and a pair of left and right line sensors 1B-L and 1B-R acting as light-receiving sensors on which images of an object to be subjected to rangefinding S are formed, respectively, arranged in parallel, and a signal processing circuit 1C for processing signals from the line sensors 1B-L and 1B-R; a rangefinding arithmetic unit 2 for calculating the distance to the object S according to sensor data outputted from the signal processing circuit 1C of the line sensor unit 1; etc.

Each of the line sensors 1B-L and 1B-R is constituted by linearly arranged cells (pixels) of photodiodes divided into a large number, e.g., 234. Each cell of the line sensors 1B-L and 1B-R photoelectrically converts the quantity of light of the image of the object S formed on its light-receiving surface, thereby outputting a luminance signal of the image of the object S to the signal processing circuit 1C.

The individual cells of the line sensors 1B-L and 1B-R are provided with respective cell numbers used when taking out their output signals. For example, the cells of the left line sensor 1B-L are provided with cell numbers of L1 to L234 successively from the left side of the drawing, whereas the cells of the right line sensor 1B-R are provided with cell numbers of R1 to R234 successively from the left side of the drawing. Five cells each on the front and rear end sides of each of the left and right line sensors 1B-L and 1B-R are so-called dummy cells, so that the left line sensor 1B-L has 224 effective pixels from L6 to L229, whereas the right line sensor 1B-R has 224 effective pixels from R6 to R229.

In response to a command signal from a line sensor controller 2A of the rangefinding arithmetic unit 2 which will be explained later, the signal processing circuit 1C controls the line sensors 1B-L and 1B-R, and inputs luminance signals from the individual cells of the line sensors 1B-L and 1B-R in association with their cell numbers. The signal processing circuit 1C integrates (sums) the inputted luminance signals, thereby generating sensor data used for the correlation calculation for each cell in association with its cell number. The sensor data exhibits lower and higher values as images of the object S are brighter and darker, respectively.

The rangefinding arithmetic unit 2 is constructed by use of hardware and software of a microcomputer. The rangefinding arithmetic unit 2 comprises not only an A/D converter 2B for converting analog sensor data signals inputted from the signal processing circuit 1C by way of an I/O interface into digital signals, but also undepicted hardware devices such as a RAM (Random Access Memory) for temporarily storing thus obtained digital sensor data signals, a ROM (Read Only Memory) storing programs and data for calculating the distance to the object S, and a CPU (Central Processing Unit) which carries out various arithmetic operations for calculating the distance to the object S according to the data stored in the ROM and RAM by executing the programs stored in the ROM.

For calculating the distance to the object S according to the sensor data generated by the signal processing circuit 1C, the rangefinding arithmetic unit 2 comprises not only the line sensor controller 2A and A/D converter 2B, but also a sensor data storage part 2C as sensor data storage means, a correlation calculator 2E, a window shifter 2F, an effective minimal value certifying part 2G, a rangefinding error determining part 2H, a distance calculator 2I, etc., which are constructed as software.

The sensor data storage part 2C inputs a pair of sensor data A/D-converted by the A/D converter 2B after being generated by the signal processing circuit 1C, and stores thus inputted sensor data as sensor data associated with the numbers of individual cells of the line sensors 1B-L and 1B-R.

The window shifter 2F controls shifting operations of a pair of windows WL and WR (see FIG. 2) for reading out a pair of sensor data used for the correlation calculation from the sensor data stored in the sensor data storage part 2C.

The window shifter 2F controls shifting operations of a pair of windows WL and WR such that a group of sensor data are read out from the sensor data storage part 2C (see FIG. 1) for each rangefinding area unit of a center area M, a left area L, and a right area R which are sensor regions set so as to overlap each other on each of the line sensors 1B-L and 1B-R as shown in FIG. 2. In this case, the window shifter 2F regulates the shifting operations of the pair of windows WL and WR in the order of the center area M, left area L, and right area R, for example.

In the shifting operations in the center areas M, M of the line sensors 1B-L and 1B-R shown in FIG. 2, the window shifter 2F successively shifts, cell by cell, the window WL corresponding to the left line sensor 1B-L from the position corresponding to the initial position at the right end of the center area M to the position corresponding to the maximum shift position at the left end, and the window WR corresponding to the right line sensor 1B-R from the position corresponding to the initial position at the left end of the center area M to the position corresponding to the maximum shift position at the right end. Here, the window shifter 2F alternately shifts, cell by cell, the windows WL and WR.

Shifting operations in the left areas L, L and right areas R, R of the line sensors 1B-1 and 1B-R effected by the window shifter 2F are substantially the same as those in the center areas M, M and thus will not be explained in detail.

Each time the pair of windows WL and WR are relatively shifted cell by cell in an alternating fashion for each of the rangefinding areas M, L, and R (see FIG. 2) set on the line sensors 1B-L and 1B-R, the correlation calculator 2E reads out a group of sensor data from the sensor data storage part 2C, and executes the correlation calculation.

The correlation calculation is one in which absolute values of differences between the group of sensor data read out by one window WL and the group of sensor data read out by the other window WR are determined, and the total of the absolute values is obtained as a correlation value. As the correlation value is lower, the degree of correlation is higher, which indicates that the respective images of the object S formed on the pair of line sensors 1B-L and 1B-R are more similar to each other.

When the object S is located at a longer distance, the positional deviation between a pair of images of the object S respectively formed on the pair of line sensors 1B-L and 1B-R by way of the pair of rangefinding lenses 1A-L and 1A-R becomes smaller. As the object S is located at a shorter distance, the positional deviation between a pair of images of the object S respectively formed on the pair of line sensors 1B-L and 1B-R becomes greater. Hence, the magnitude of the positional deviation between the pair of images can be detected as the shift amount of the pair of windows WL and WR until the degree of correlation indicative of the similarity between the pair of windows is maximized, i.e., the shift amount of the pair of windows WL and WR until the correlation value obtained by the correlation calculation becomes the smallest minimal value or peak value.

Figure 3:
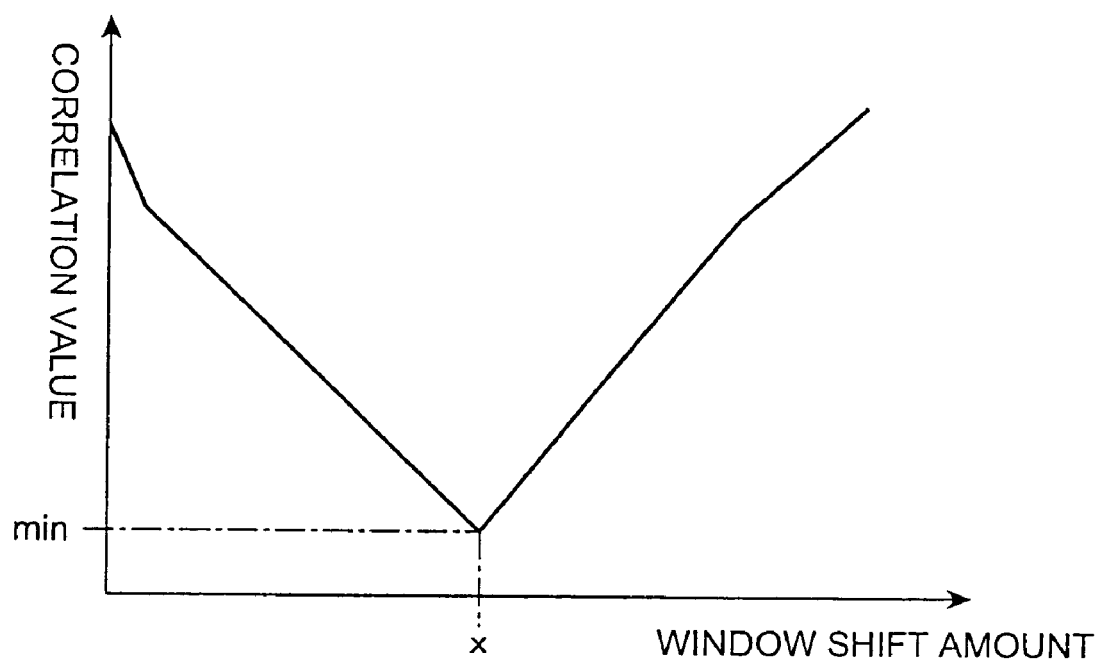
FIG. 3 A graph showing the relationship between the correlation value of a pair of images of an object to be subjected to rangefinding and the window shift amount.

Therefore, basically as shown in the graph of FIG. 3, the distance calculator 2I shown in FIG. 1 calculates the distance to the object S according to the shift amount x of the windows WL and WR corresponding to the smallest minimal value min of the correlation value calculated by the correlation calculator 2E. According to effective minimal values certified for the individual rangefinding area units M, L, and R (see FIG. 2) of the line sensors 1B-L and 1B-R by the effective minimal value certifying part 2G, which will be explained later, the distance calculator 2I calculates respective distances to the object S, and determines the distance to the object S by a predetermined averaging operation using the shortest of thus obtained distances as a reference distance.

For calculating the distance to the object S in more detail, the distance calculator 2I calculates an interpolated value according to the shift amount of windows WL and WR corresponding to the effective minimal value of the correlation value and two shift amounts respectively lower and higher than the above-mentioned shift amount. According to a shift amount corresponding to the interpolated value, the distance calculator 2I calculates the distance to the object S with reference to parameters such as the gap between the pair of rangefinding lenses 1A-L, 1A-R and the pair of line sensors 1B-L, 1B-R, the center space between the pair of line sensors 1B-L and 1B-R, and pitch intervals of individual cells in the pair of line sensors 1B-L and 1B-R.

Figure 4:
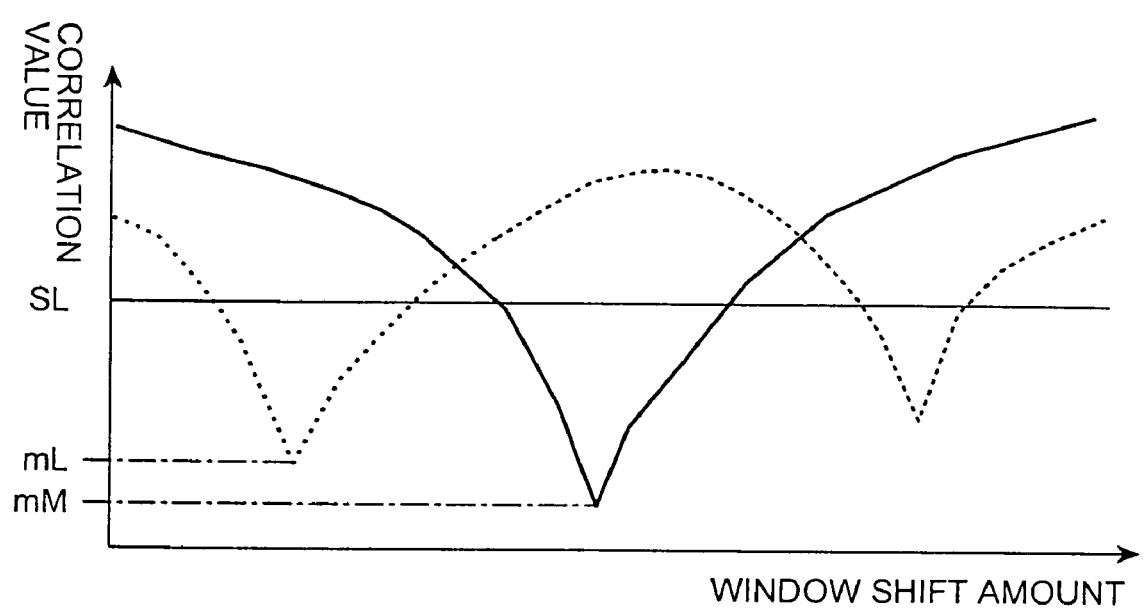
FIG. 4 A graph showing the relationship between the correlation value showing the degree of correlation of a pair of images of the object and the shift amount of windows together with a reference value SL for the degree of correlation.

The effective minimal value certifying part 2G shown in FIG. 1 compares the smallest minimal value exhibiting the highest degree of correlation among correlation values calculated in each of rangefinding area units M, L, and R (see FIG. 2) of the line sensors 1B-L and 1B-R with a predetermined reference value SL for the degree of correlation (see FIG. 4). Then, thus obtained smallest minimal values lower than the reference value SL are certified as effective minimal values effective for the rangefinding calculation for the respective rangefinding areas. Namely, they are certified as effective minimal values mM, mL, and mR (not depicted) in the center area M, left area L, and right area R, respectively.

The rangefinding error determining part 2H (see FIG. 1) determines whether the certified effective minimal values are in error or not. This error determination is carried out (1) when the sensor data read out from the sensor data storage part 2C are data with a low luminance and an ultralow contrast; (2) when a difference exists between left and right sensor data read out from the sensor data storage part 2C; (3) when two or more minimal values with a small difference therebetween exist in correlation values calculated by the correlation calculator 2E; (4) when the difference between the smallest minimal value calculated by the correlation calculator 2E and respective correlation values corresponding to two shift amounts lower and higher than the shift amount of windows WL and WR corresponding to the smallest minimal value is small; etc.

Figure 5:
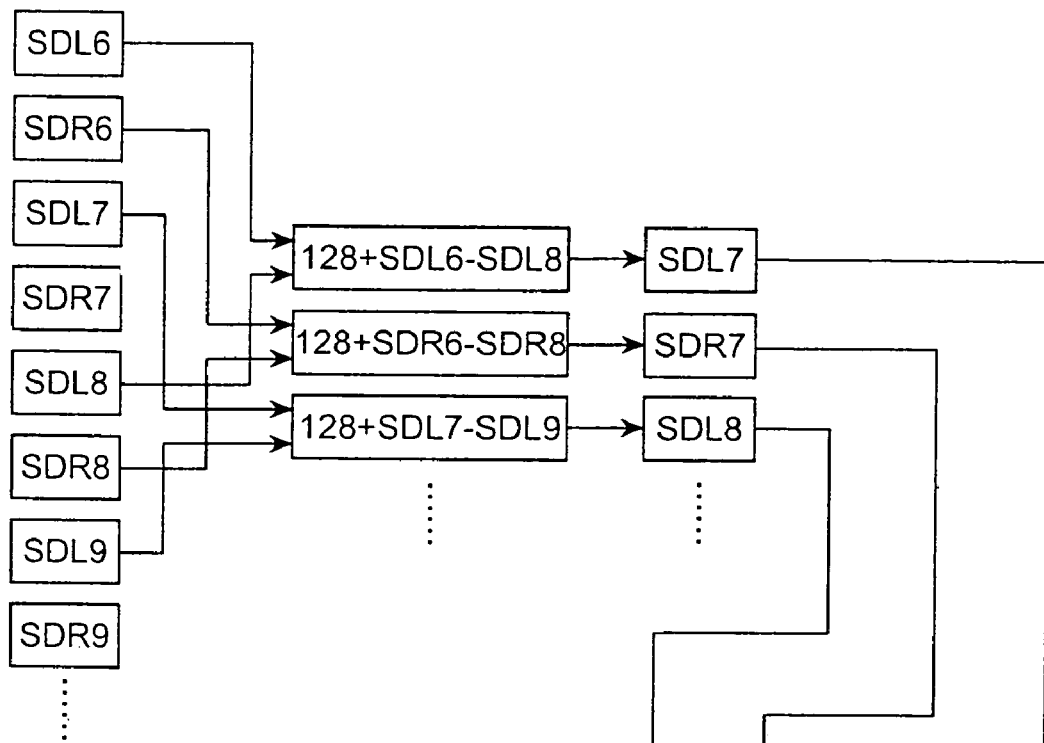
FIG. 5 A schematic view showing functions of the sensor data storage part shown in FIG. 1.
Figure 5:
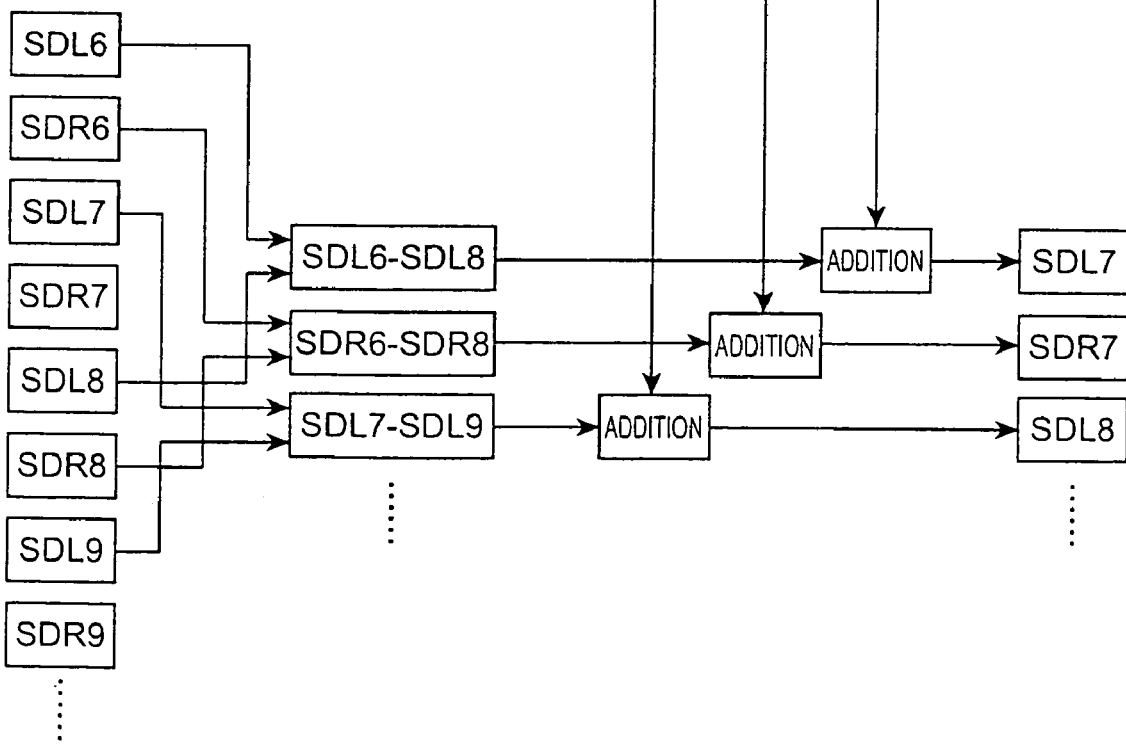

Here, as shown in FIG. 5, the sensor data storage part 2C stores two-pixel differential data of every other pixels (128+SDL6−SDL8), (128+SDL7−SDL9), . . . of sensor data SDL6, SDL7, SDL8, SDL9, . . . and two-pixel differential data of every other pixels (128+SDR6−SDR8), (128+SDR7−SDR9), . . . of sensor data SDR6, SDR7, SDR8, SDR9, and stores these two-pixel differential data (128+SDL6−SDL8), (128+SDR6−SDR8), (128+SDL7−SDL9), . . . as correlation calculation sensor data SDL7, SDR7, SDL8, . . . .

From the two-pixel differential data, the sensor data storage part 2C recognizes whether the luminance and contrast of images of the object S are high or low. The sensor data storage part 2C is configured such that, when the sensor data SDL6 to SDL229 and SDR6 to SDR229 which were inputted for the first time after the A/D conversion by way of the A/D converter 2B from the signal processing circuit 1C include data with a low luminance and a low contrast, the sensor data are inputted at least once more after being A/D-converted from the signal processing circuit 1C, and thus inputted sensor data and the low-luminance and low-contrast sensor data inputted after being A/D-converted for the first time are added together.

Namely, when the two-pixel differential data of sensor data SDL6 to SDL229, SDR6 to SDR229 inputted from the A/D converter 2B for the first time include data with a low luminance and a low contrast (excluding an ultralow contrast), for a rangefinding area including sensor data on which the two-pixel differential data SDL7, SDR7, SDL8, . . . are based, the sensor data are inputted at least once more from the signal processing circuit 1C by way of the A/D converter 2B, two-pixel differential data (SDL6−SDL8), (SDR6−SDR8), (SDL7−SDL9), . . . are generated again as shown in FIG. 5. These two-pixel differential data (SDL6−SDL8), (SDR6−SDR8), (SDL7−SDL9), . . . are added to the sensor data SDL7, SDR7, SDL8, . . . which are the two-pixel differential data generated for the first time, respectively, and thus obtained sums of data are stored again.

The number of operations necessary for A/D-converting and inputting sensor data with a low luminance and a low contrast again and adding thus inputted sensor data is set to 1 to several times according to the extent of low contrast in sensor data.

When images of the object S are formed on the light-receiving surfaces of the pair of line sensors 1B-L and 1B-R through the pair of rangefinding lenses 1A-L and 1A-R, respectively, in the rangefinder apparatus in accordance with this embodiment configured as in the foregoing, the signal processing circuit 1C inputs luminance signals corresponding to the images of the object S from the pair of line sensors 1B-L, 1B-R in response to a request signal from the rangefinding arithmetic unit 2, and integrates (sums) thus inputted luminance signals, thereby generating a pair of sensor data for use in the correlation calculation.

Figure 6:
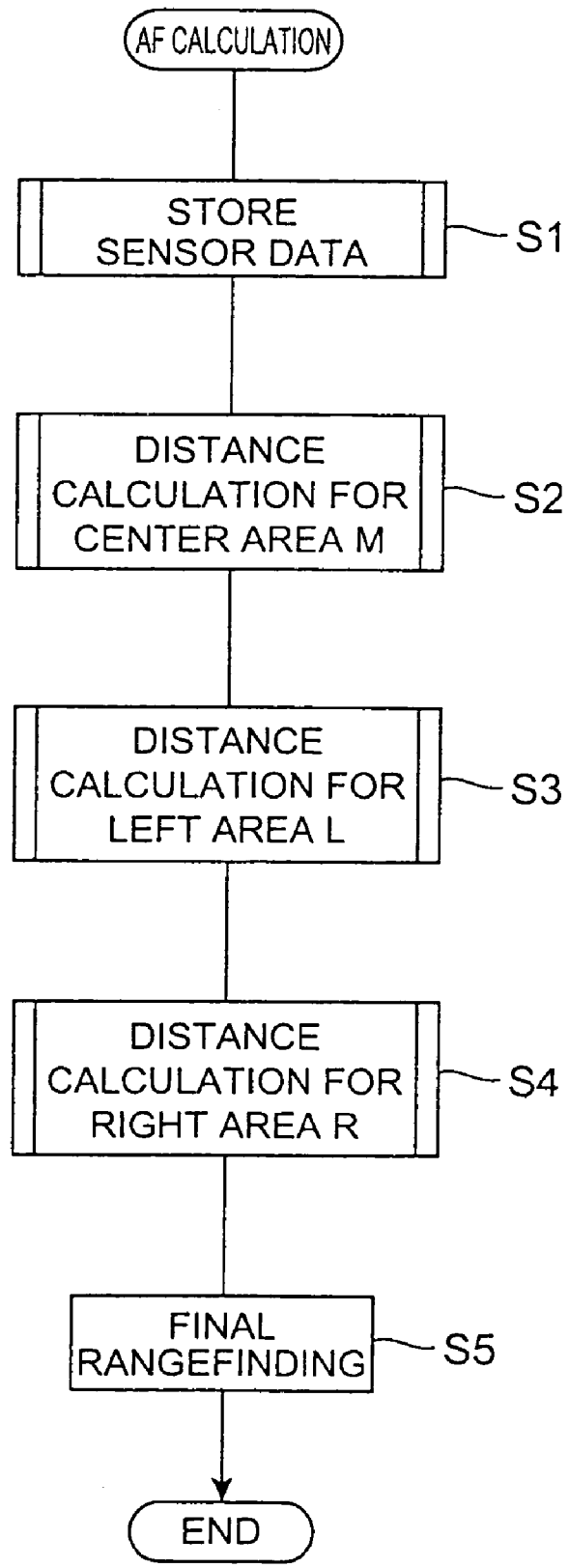
FIG. 6 A flowchart showing the processing procedure in the rangefinding arithmetic unit shown in FIG. 1.

Thereafter, the rangefinding arithmetic unit 2 calculates the distance to the object S according to the processing procedure of the flowchart of the main routine shown in FIG. 6. First, the sensor data generated by the signal processing circuit 1C are A/D-converted by the A/D converter 2B, and the resulting digital data are inputted to the sensor data storage part 2C. Thus inputted sensor data are stored as correlation calculation sensor data SDL7, SDR7, SDL8, . . . into the sensor data storage part 2C (S1).

Next, according to the sensor data SDL7, SDR7, SDL8, . . . stored in the sensor data storage part 2C, a distance calculating operation for the center area M based on sensor data of a pair of images of the object S formed in the center areas M, M (see FIG. 2) of the line sensors 1B-L, 1B-R is carried out (S2). Subsequently, a distance calculating operation for the left area L based on sensor data of a pair of images of the object S formed on the left areas L, L (see FIG. 2) of the line sensors 1B-L, 1B-R is carried out (S3), and then a distance calculating operation for the right area R based on sensor data of a pair of images of the object S formed on the right areas R, R (see FIG. 2) of the line sensors 1B-L, 1B-R is carried out (S4).

At the next step S5, a final rangefinding operation for calculating the final distance to the object S according to the respective distances in the center area M, left area L, and right area R calculated in steps S2 to S4 is carried out. In the final rangefinding operation, with reference to the shortest of the calculated distances in the center area M, left area L, and right area R, respective differences of the calculated distances in other rangefinding areas within a predetermined distance range set farther than the reference distance from the reference distance are determined, and an average value of thus obtained distance differences is added to the reference distance, so as to yield the final rangefinding result.

Figure 7:
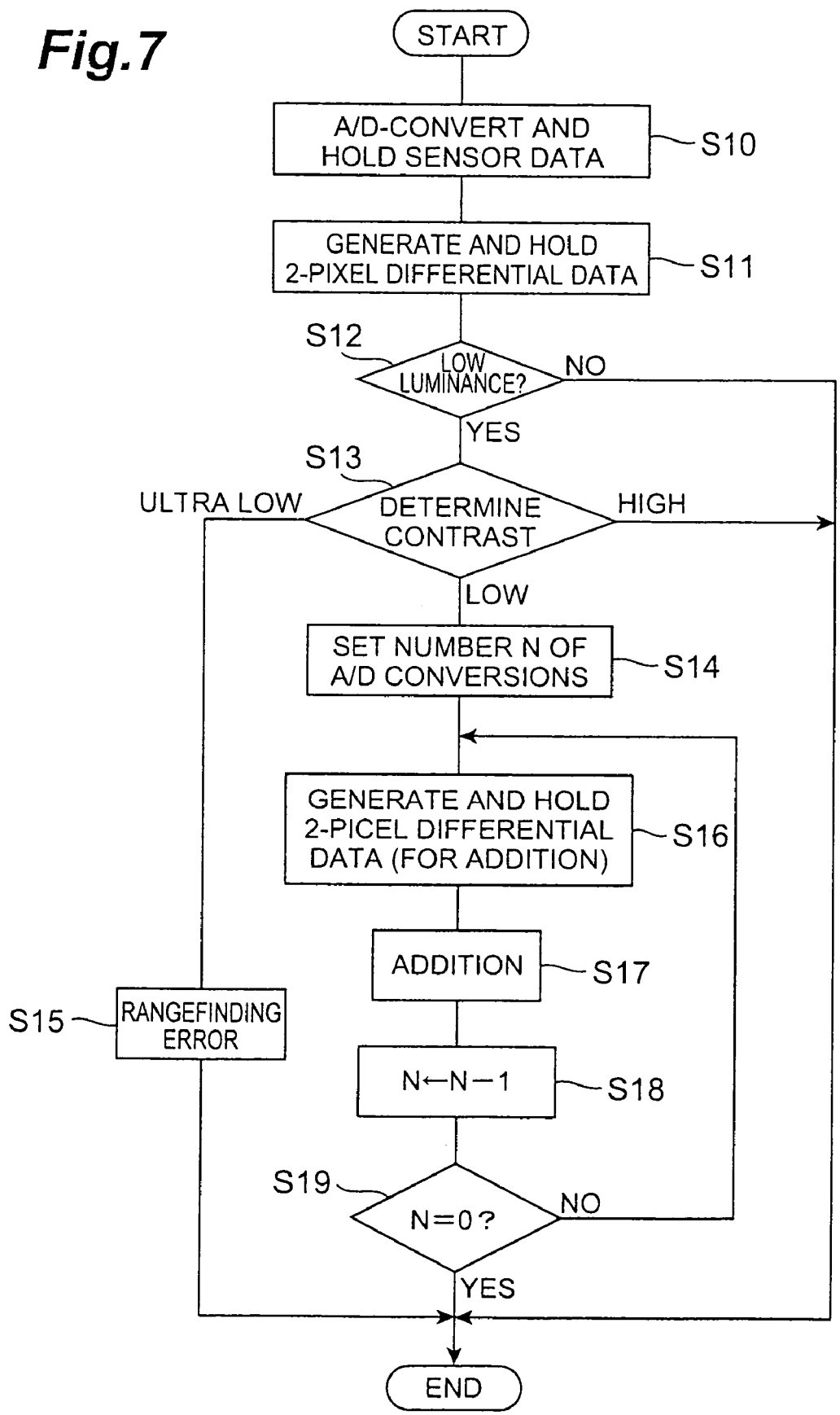
FIG. 7 A flowchart showing the processing procedure in the subroutine of step S1 shown in FIG. 6.

In the subroutine of step S1 shown in FIG. 6, operations of steps S10 to S19 shown in FIG. 7 are carried out. First, at step S10, a pair of sensor data generated by the signal processing circuit 1C are A/D-converted by the A/D converter 2B, and the resulting digital data are inputted, so as to be stored as sensor data SDL6 to SDL229, SDR6 to SDR229 in the sensor data storage part 2C.

In the subsequent step S11, according to the sensor data SDL6 to SDL229, SDR6 to SDR229 stored in the sensor data storage part 2C, two-pixel differential data (128+SDL6−SDL8), (128+SDR6−SDR8), (128+SDL7−SDL9), . . . are generated by the sensor data storage part 2C (FIG. 5), and are stored as correlation calculation sensor data SDL7, SDR7, SDL8, . . . into the sensor data storage part 2C.

Thereafter, it is determined whether the luminance of the images of the object S is low or not (S12). When the result of determination is YES, so that the luminance of images of the object S is low, it is subsequently determined whether the contrast of images of the object S is high or low (S13). These determinations are carried out according to the two-pixel differential data stored as the correlation calculation sensor data SDL7, SDR7, SDL8, . . . by the sensor data storage part 2C. As an example of determining the contrast level, comparison of the difference between the maximum and minimum values among the sensor data for correlation calculation, SDL7, SDL8, SDL9, . . . with the threshold values (first reference value<second reference value) are conducted, and for the sensor data for correlation calculation, SDR7, SDR8, SDR9, . . . same comparisons are conducted. When at least one of the differences is below the first reference value, it is determined that the contrast is very low. When one of the differences is above the first reference value but below the second reference value, and the other is above the first reference value, it is determined that the contrast is low. When both differences are above the second reference value, it is determined that the contrast is high.

When the result of determination at step S13 is "low", so that the sensor data SDL7, SDR7, SDL8, . . . , which are two-pixel differential data of the sensor data SDL6 to SDL229, SDR6 to SDR229 inputted for the first time from the signal processing circuit 1C by way of the A/D converter 2B, for rangefinding areas including sensor data on which two-pixel differential data SDL7, SDR7, SDL8, . . . with a low luminance and a low contrast are based, the sensor data are inputted again from the signal processing circuit 1C by way of the A/D converter 2B, and the number N of a series of operations required for adding the two-pixel differential data is set by the sensor data storage part 2C (S14).

When the result of determination at step S13 is "ultralow", so that the contrast of images of the object S is very low, the rangefinding for the object S is impossible, so that a rangefinding error process is carried out (S15). Thereafter, the subroutine at step S1 shown in FIG. 6 ends.

In any of the cases where the result of determination at step S12 is NO and where the result of determination at step S13 is "high", the subroutine at step S1 shown in FIG. 6 ends directly.

At step S16 subsequent to step S14, for the rangefinding areas including sensor data with a low luminance and a low contrast, the sensor data are inputted again from the signal processing circuit 1C by way of the A/D converter 2B, whereby two-pixel differential data (SDL6−SDL8), (SDR6−SDR8), (SDL7−SDL9), . . . are generated and stored by the sensor data storage part 2C.

At the next step S17, the regenerated two-pixel differential data with a low luminance and a low contrast (SDL6−SDL8), (SDR6−SDR8), (SDL7−SDL9), . . . and sensor data SDL7, SDR7, SDL8, . . . , which are initially generated two-pixel differential data with a low luminance and a low contrast, are added together. Then, the resulting sensor data are stored again as sensor data SDL7, SDR7, SDL8, . . . usable for the correlation calculation.

Each time a series of processing at steps S16 and S17 are carried out, 1 is subtracted at the subsequent step S18 from the required number N set at step S14. At the next step S19, it is determined whether the required number N has become 0 or not. When the result of determination is NO, so that the required number N remains, the flow returns to step S16. When the result of determination is YES, the subroutine at step S1 shown in FIG. 6 ends.

Figure 8:
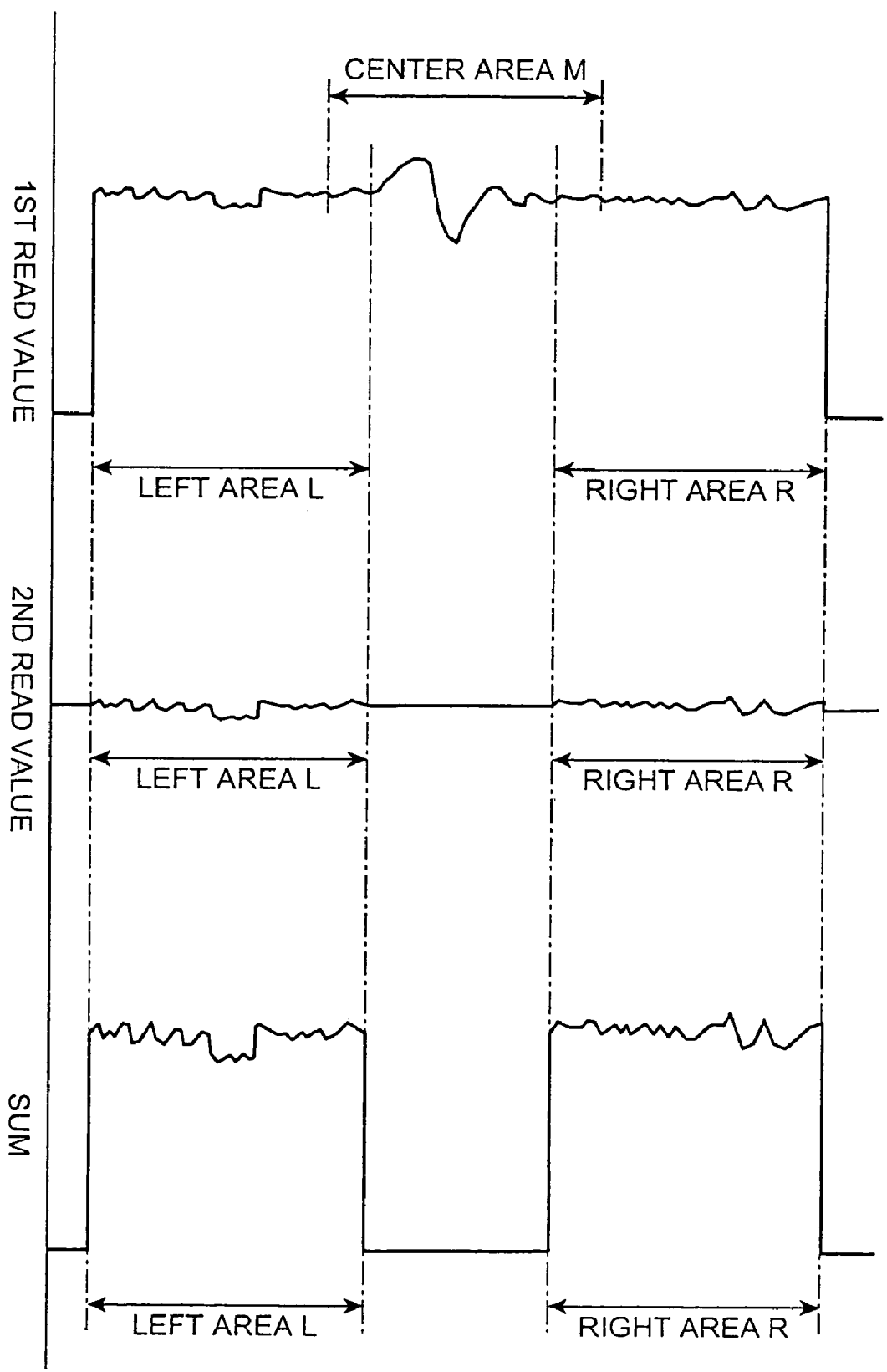
FIG. 8 A graph explaining the adding operation at step S17 shown in FIG. 7.

FIG. 8 shows the sensor data SDL7, SDR7, SDL8, . . . (first read value) generated at step S10; the two-pixel differential data (SDL6−SDL8), (SDR6−SDR8), (SDL7−SDL9), . . . (second read value); and the sum of the first and second read values added together at step S17.

In the first read value, as shown in FIG. 8, the left area L and right area R excluding the center area M include data with a low luminance and a low contrast. Therefore, two-pixel differential data (SDL6−SDL8), (SDR6−SDR8), (SDL7−SDL9), . . . corresponding to the left area L and right area R alone are generated as the second read value. As a result, the sum of the first and second read values in the left area L and right area R excluding the center area M is doubled, so as to be usable as sensor data for rangefinding.

Figure 9:
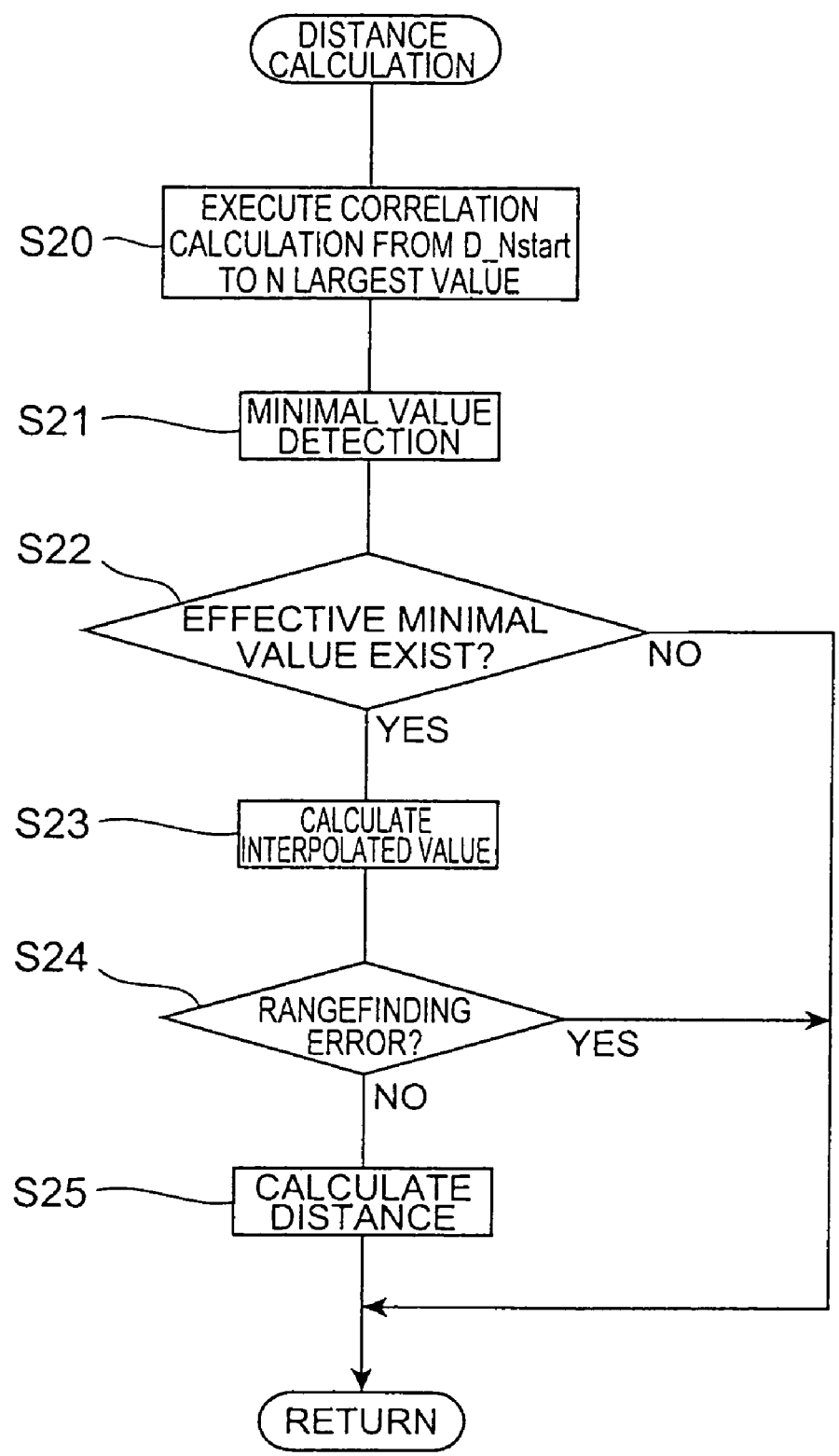
FIG. 9 A flowchart showing the processing procedure in the subroutine of steps S2 to S4 shown in FIG. 6.

In the subroutine of steps S2 to S4 shown in FIG. 6, operations of steps S20 to S25 shown in the flowchart of FIG. 9 are carried out. First, in the distance calculating operation for center area M shown at step S2 of FIG. 6, the correlation calculation is carried out within the range of D_Nstart to n largest value, which is a shift range of the windows WL, WR, for a pair of images of the object S formed in the center areas M, M of the line sensors 1B-L, 1B-R. The initial value of D_Nstart is the n smallest value, which is the smallest value of the shift amount. The correlation calculation is carried out over the whole region of the windows WL, WR corresponding to the center areas M, M.

In the next step S21, as the minimal value detection, smallest values of correlation values, minimal values, the number of minimal values, and the shift amount of windows WL and WR corresponding to the minimal values are detected in the range subjected to the correlation calculation at step S20. According to the detected values, it is determined at the next step S22 whether an effective minimal value effective for the rangefinding calculation exists or not.

Figure 10:
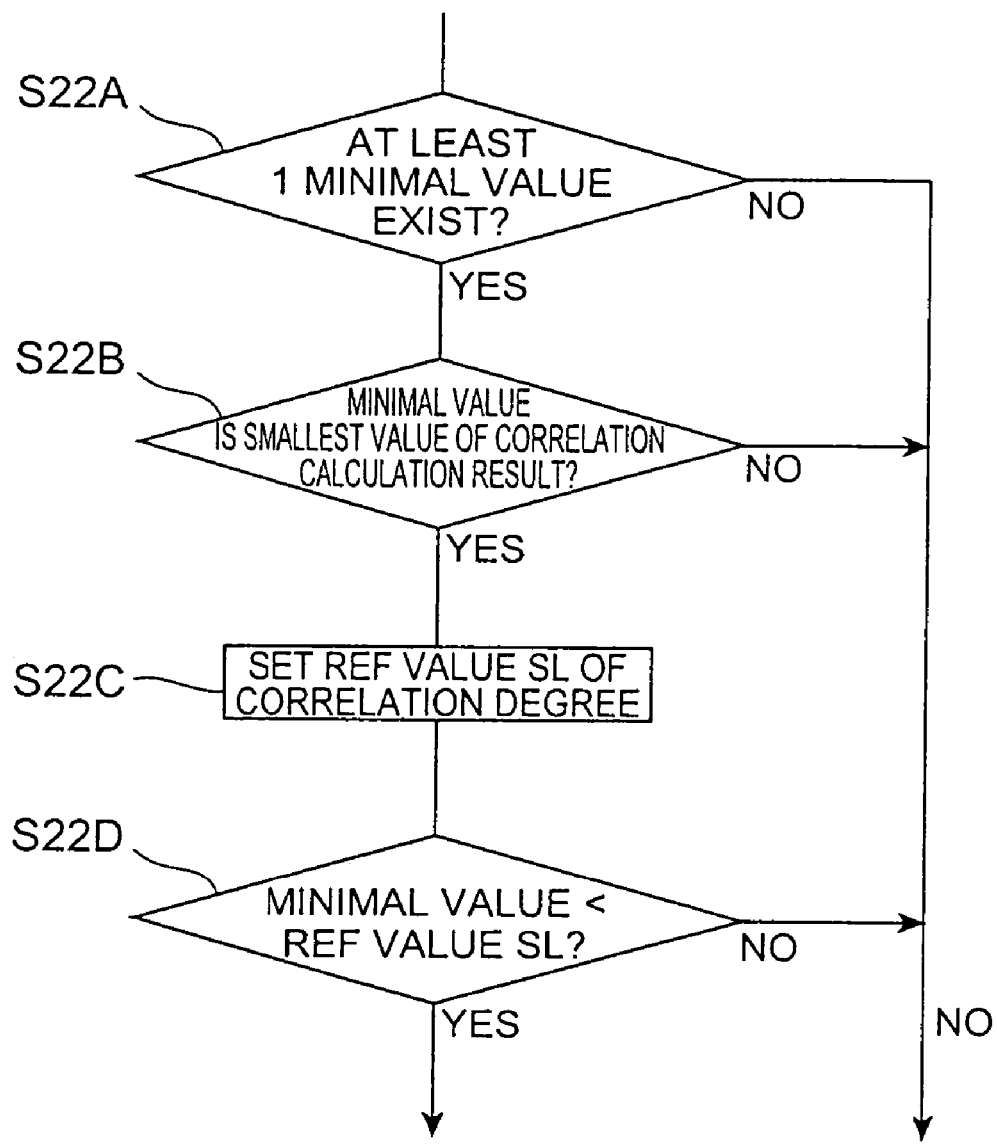
FIG. 10 A flowchart showing details of the processing procedure of step S22 shown in FIG. 9.

The determining operation at step S22 includes a series of steps S22A to S22D shown in FIG. 10. First, at step S22A, it is determined whether the number of minimal values is at least 1 or not. When the result of determination is YES, so that at least one minimal value exists, the flow proceeds to the next step S22B.

At step S22B, it is determined whether or not the minimal value is the smallest value in the range subjected to the correlation calculation. When the result of determination is YES, so that the minimal value is the smallest value, the flow proceeds to the next step S22C.

At step S22C, a reference value SL for the degree of correlation for certifying the minimal value exhibiting the smallest value as an effective minimal value effective for the rangefinding calculation is set. This reference value SL is set according to the contrast of images of the object S such as to increase in proportion to the increase in contrast until the contrast reaches a predetermined high reference value, and be held at a fixed value when the contrast exceeds the reference value. Namely, the reference value SL is set to a high value when the contrast of images of the object S is high, and a lower value as the contrast is lower.

At step S22D subsequent to step S22C, it is determined whether the minimal value exhibiting the smallest value is lower than the reference value SL for the degree of correlation or not. When the result of determination is YES, so that the minimal value exhibiting the smallest value is lower than the reference value SL for the degree of correlation, it is certified that the effective minimal value mM (see FIG. 4) exists in the center area M, so that the result of determination at step S22 shown in FIG. 9 becomes YES, whereby the flow proceeds to the next step S23, at which an interpolated value is calculated.

When the results of determinations at steps S22A, S22B, and S22D shown in FIG. 10 are all NO, so that no effective minimal values exist, the result of determination at step S22 shown in FIG. 9 becomes NO. As a consequence, a series of operations from steps S23 to S25 are omitted in order to shorten the rangefinding time, and the rangefinding operation for center area M shown at step S2 of FIG. 6 is terminated, whereby the flow proceeds to step S3, at which a distance calculating operation for left area L is carried out.

In the interpolated value calculation at step S23 subsequent to step S22 in FIG. 9, by using the effective minimal value mM (see FIG. 4) for center area M certified at step S22 and two correlation values respectively corresponding to two shift amounts on both sides of the shift amount of windows WL and WR corresponding to the effective minimal value, an interpolated value for the shift amount is determined, and is employed as the shift amount x of windows WL and WR corresponding to the effective minimal value.

At the next step S24, the above-mentioned rangefinding error determining part 2H (see FIG. 1) determines whether there is a rangefinding error or not. When the result of determination is YES, so that there is a rangefinding error, the processing at the next step S25 is omitted in order to shorten the rangefinding time, thus completing the processing of step S2 shown in FIG. 6, and the flow proceeds to the processing at the next step S3.

When the result of determination at step S24 is NO, so that there is no rangefinding error, the flow proceeds to the next step S25, at which the distance is calculated. Namely, the distance to the object S in the center area M is calculated according to the shift amount x determined at step S23 with reference to parameters such as the gap between the pair of rangefinding lenses 1A-L, 1A-R and the pair of line sensors 1B-L, 1B-R, the center space between the pair of line sensors 1B-L and 1B-R, pitch intervals of individual cells in the pair of line sensors 1B-L and 1B-R, and temperature conditions.

When the distance to the object S in the center area M is calculated at step S25, the distance calculating operation for center area M shown at step S2 of FIG. 6 is completed. Subsequently, the distance calculating operation for left area L shown at step S3 and the distance calculating operation for right area R shown at step S4 are carried out in succession according to the flowchart of FIG. 9.

In the rangefinder apparatus in accordance with this embodiment, as explained in the foregoing, when differential data of sensor data SDL6 to SDL229, SDR6 to SDR229 inputted to the sensor data storage part 2C after being A/D-converted by way of the A/D converter 2B from the signal processing circuit 1C for the first time include sensor data with a low luminance and a low contrast, for a rangefinding area including the sensor data with a low luminance and a low contrast, the sensor data are inputted again from the signal processing circuit 1C after being A/D-converted by the A/D converter 2B, and two-pixel differential data (SDL6–SDL8), (SDR6–SDR8), (SDL7–SDL9), . . . of thus inputted sensor data are generated as second read values. Then, the two-pixel differential data (SDL6–SDL8), (SDR6–SDR8), (SDL7–SDL9), . . . regenerated as the second read values and the sensor data SDL7, SDR7, SDL8, . . . , which are initially generated two-pixel differential data, are added together.

As a result, the value of data with a low luminance and a low contrast is doubled, so as to be usable for the correlation calculation. Then, the correlation calculation by the correlation calculator 2E and the distance calculation by the distance calculator 2I are carried out according to the sum sensor data SDL7, SDR7, SDL8, . . . , which enables the rangefinding with respect to the object having a low luminance and a low contrast. Therefore, the rangefinding accuracy can be improved when taking a picture against light, the background of a night scene, or the like.

Also, the time required for A/D-converting the sensor data again and adding thus obtained digital data to those obtained earlier for the rangefinding area including sensor data with a low luminance and a low contrast is much shorter than the integration time required for integrating output signals of a pair of line sensors again for a region with a low luminance and a low contrast as in the conventional example, whereby the rangefinding time can greatly be shortened.

The present invention should not be limited to the above-mentioned embodiment. For example, the correlation calculation in the order of the center area M, left area L, and right area R on the line sensors 1B-L and 1B-R can be changed to that of the center area M, right area R, and left area L; that of the left area L, center area M, and right area R; and the like as appropriate.

The rangefinding areas on each of the line sensors 1B-L and 1B-R are not limited to the three areas of the center area M, left area L, and right area R, but may be five areas including a left middle area LM and a right middle area RM in addition thereto.

What is claimed is:

1. A rangefinder apparatus for passive rangefinding by successively carrying out a correlation calculation for each of a plurality of rangefinding areas according to respective output signals of a pair of light-detecting sensors on which a pair of images are formed by external light from an object to be subjected to rangefinding, and by calculating a distance to the object according to a minimal value exhibiting the highest degree of correlation in correlation values obtained by the correlation calculation for each rangefinding area, the rangefinder apparatus comprising sensor data storage means for receiving a pair of A/D-converted sensor data generated according to the output signals of the pair of light-detecting sensors and storing the sensor data received as sensor data for the correlation calculation, wherein the sensor data storage means receives sensor data at least one additional time for a rangefinding area for which sensor data received for the first time includes data with low contrast, adds the sensor data received at least one additional time to the sensor data received for the first time to produce a sum, and stores the sum.

* * * * *